Patented Dec. 22, 1953

2,663,629

UNITED STATES PATENT OFFICE 2,663,629

LEAF OR VEGETATIVE FERTILIZER

Waldo L. Semon, Silver Lake, Ohio, assignor to The B. F. Goodrich Company, New York, N. Y., a corporation of New York No Drawing. Application July 27, 1950, Serial No. 176,245

6 Claims. (Cl. 71—30)

This invention relates to plant feeding or fertilization for the purpose of supplying nitrogen, and more specifically pertains to plant fertilizing compositions containing, as essential nitrogen supplying nutrient, a diamide of a dicarboxylic organic acid. The invention also relates to the method of feeding plant life during the growing season by application, to the leaves, foilliage or vegetative growth thereof, of such nitrogen-supplying diamides.

It has long been a common practice to add plant foods or fertilizers, especially those which supply essential nitrogen, to the soil in which plants are grown. Such plant foods are generally superficially mixed with the soil prior to or at the time of planting. However, in order to obtain the greatest yield of plant or plant products per unit area, modern agriculturalists often supplement the normal fertilization by a side dressing addition of nitrogen-supplying plant foods to the soil between the rows of cultivated plants during their cultivation or growing period. Among the high nitrogen materials which have found extensive use in such supplemental feeding are liquid ammonia, aqueous ammonia, ammonium nitrate, ammonium sulfate, and urea.

More recently, attempts have been made to supplement the feeding of plants by a process of leaf fertilization involving the application of a high nitrogen content material to the leaves or vegetative growth of the plant during the active growing season. The purpose of such fertilization is to make nitrogen easily available to the plant at the time it is most needed, thereby to induce a rapid vegetative growth and thus increase the yield of the desired plant or plant product, without depleting the soil of essential natural plant foods.

At the present time the use of urea as a leaf fertilizer for fruit trees, especially apple trees, and vegetable crop plants is being recommended. Urea is very soluble in water; 100 parts by weight of water will dissolve 78 parts of urea at 41° F. and 119.3 parts at 77° F.; hence urea can be dissolved in water and the aqueous solution sprayed on the leaves or vegetative growth. Because of the high solubility of urea in water, it is absorbed in the leaf tissue within a matter of hours after application and its effect on the plant growth is noticeable in about a week. However, the urea is so rapidly consumed by the plant that the usual signs of nitrogen deficiency are soon present. Then too, because of the high water solubility of urea, dew and rain remove the urea from the leaves and vegetative growth of the plants. The use of "stickers" in aqueous urea spray formulations tends to retard somewhat the removal of urea by rain and dew but does not entirely prevent it. Consequently, to obtain the desired result, depletion of the urea deposit by either of the two effects described above must be compensated for by the application of additional urea sprays, thereby increasing the cost of employing such supplemental feeding. In addition, the use of urea as a leaf spray has still another disadvantage in that its application in concentrations higher than 5 pounds per 100 gallons of water often produces serious injury such as leaf burning of the treated plants.

I have discovered that supplemental nitrogen feeding of plants can be very successfully accomplished through the leaves, foilliage or vegetative growth by the application thereto, of fluent sprayable or dustable compositions containing as an essential nitrogen-supplying nutrient, a diamide of a dicarboxylic acid of the general formula

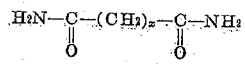

where $x$ is a number from 0 to 5. In general these diamides have a very low solubility in water and hence it is desirable, but not absolutely essential, to disperse them in an aqueous solution of a wetting or dispersing agent (surface active agent) to prepare aqueous compositions which are useful according to this invention. Other fluent leaf or vegetative fertilizing compositions include dusts which may or may not contain a surface-active agent. In general, therefore, any composition containing the diamide dispersed, dissolved or otherwise uniformly associated with a fluent inert carrier may be used. The concentration of diamide in such compositions will vary, as hereinafter explained, but is ordinary less than 50% by weight and is preferably from 0.1 to 25% by weight. However, the diamide per se in powdered dustable form may also be used.

Any of the diamides having the above general formula can be used as leaf or vegetative fertilizers. Specific members of this class are oxamide, which is preferred, malonamide, succinamide, glutaramide, adipamide, and pimelamide (where $x$ is 0, 1, 2, 3, 4 and 5 respectively). The following table gives the water solubility of some of the members of the diamides defined above together with their nitrogen content expressed in per cent.

Table I

| Compound | Water solubility parts per 100 parts H₂O | Percent nitrogen |
|---|---|---|
| Oxamide | 0.04 at 45° F | 31.8 |
| Malonamide | 8.3 at 46° F | 27.4 |
| Succinamide | 0.45 at 59° F | 24.1 |
| Adipamide | 0.44 at 54° F | 19.5 |

Excellent and unusual results are achieved from the use of these diamides as leaf or vegetative fertilizers. Their relatively low solubility in water tends to prevent their removal from the treated plants during light rainfall or heavy dew. Their low water solubility also prevents overfeeding immediately after application and permits the distribution of the supplemental feeding over the entire growing period of the treated plants. Unlike urea these diamides are completely non-phytotoxic and do not cause injury to the treated plants, even when applied at high concentrations. For instance, oxamide may be applied as a dust to the foliage of plants. Even when so applied overfeeding or burning does not occur due primarily to the low water solubility and absence of phytotoxicity of oxamide. After such application, when dew collects on the leaves a certain amount of oxamide dissolves and the plant receives a fresh stimulus to growth. If a sticker is applied along with the oxamide the mixture will not be washed off even by heavy rain, the rain dissolves a slight amount of the oxamide with resulting absorption into the leaves and stimulation in growth of the plant. For all these reasons, oxamide is a much more effective leaf fertilizer than urea despite its lower content of nitrogen.

As has been mentioned, the fertilizer compositions containing the diamides hereinbefore described are preferably prepared by incorporating the diamide with a carrier to prepare a liquid sprayable composition or a sprayable dust. The dusts are prepared by mixing the diamide with an inert, finely-divided, pulverulent solid such as talc, calcium carbonate, diatomaceous earth, bentonite and other clays. A sticking agent such as fish oil may be incorporated into the dust composition if desired. Likewise a wetting agent may be used in the preparation of the dust formulations where it is desired to enhance the covering power of the dust.

In general the least expensive liquid spray composition which can be employed is one which employs an aqueous medium as a carrier. To prepare such aqueous spray compositions it is preferred to disperse the diamide in an aqueous solution of a wetting or dispersing agent, since the diamides possess a limited solubility in water. By using an aqueous solution of a wetting or dispersing agent the desired amount of the less soluble diamides can be incorporated into convenient quantities of water, and in this way, aqueous dispersions containing the diamide in an amount greatly exceeding their water solubility can be prepared.

Suitable dispersing or wetting agents (also called surface-active agents) which can be used to prepare the above-described compositions can be typified by the following general classifications: sodium and potassium salts of fatty acids known as soft and hard soaps; salts of disproportionated abietic acid known as rosin soaps; salts of the hydroxyaldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having 8 to 18 carbon atoms in the alkyl group; water-soluble aryl sulfonates; water-soluble alkyl aryl sulfonates; water-soluble aralkyl sulfonates; water-soluble sorbitan monolaurate, -palmitate, -stearate, and -oleate; quaternary ammonium alkyl halides; fatty acids saponified with amines and amino alcohols; blood albumen and others. These materials are sold under numerous trade names either as pure compounds or mixtures of compounds of the same class or mixtures of these compounds with fillers or diluents.

When the above surface active agents are employed to prepare the fertilizing compositions of this invention it will be necessary to use only from 0.01% to about 1% by weight of them, based on the entire composition, depending on the efficiency of the specific agent employed.

Another convenient method of preparing leaf fertilizing compositions is to add the diamide to an aqueous dispersion of a polymeric material. One polymeric material which is extremely useful is polymeric ethylene polysulfide having a sulfur content of 3 to 4.5 sulfur atoms per molecular unit, especially such a polymeric ethylene polysulfide as prepared in the presence of a lignin sulfonate in the manner described in U. S. Patent 2,470,115 issued May 17, 1949, to W. D. Stewart. Such polymeric polyethylene polysulfides are available in a semi-solid form containing a lignin sulfonate dispersing agent and are sold under the trade name "Goodrite p.e.p.s.". To make up 100 gallons of spary composition, 2 pounds of this "Goodrite p.e.p.s." are added to about 10 gallons of water with vigorous stirring. Then the diamide is added and thoroughly mixed. The resulting mixture is diluted with sufficient water to make 100 gallons of spray. In this manner a spray composition containing up to 5% by weight of the diamide can be prepared. Greater amounts of the diamide fertilizer, up to 10% by weight, can be dispersed with 4 to 6 pounds of this polymeric ethylene polysulfide product containing the lignin sulfonate.

Another aqueous dispersion of a polymeric material which is quite useful as a carrier for the diamides is an aqueous dispersion of a vinyl polymer sold under the name of "Goodrite VL600". This material contains sufficient dispersing agent to disperse up to about 5% by weight of diamide.

The following specific examples illustrate the invention and the results obtained by its practice.

EXAMPLE I

An aqueous dispersion containing 0.25% by weight of oxamide and 0.1 to 1.0% by weight of sodium lignin sulfonate as a dispersing agent was sprayed on a 10 ft. row of head lettuce until the plants were completely wetted and even dripping. Another row of head lettuce in the same plot was sprayed in a like manner with an aqueous solution containing 0.25% urea. A row adjacent to the row treated with oxamide received no treatment. When the heads of lettuce were ready for harvest the heads in each row were counted and the total weight per row was determined. In this manner an average weight per head was determined. The results of this test are shown in Table II below. Although these tests were carried out during a period of drought and the total growth was somewhat less than would have otherwise been expected, the tests do show valid relative differences between the two supplemental feedings.

Table II.—Head lettuce supplemental feeding

| Active ingredient | Concentration, percent | No. of heads | Average weight of heads (grams) | Percent increase over control |
|---|---|---|---|---|
| Oxamide | 0.25 | 20 | 584.3 | 166 |
| Urea | 0.25 | 21 | 509.5 | 142 |
| None (control) | | 13 | 352.7 | |

The difference in the response of the growing lettuce to urea and oxamide was apparent to the eye. The lettuce plants treated with urea were noticeably greener in 6 days and exhibited greater initial growth than did the lettuce plants treated with oxamide, but, by harvest time, the lettuce plants which had been treated with urea had reverted to a yellowish green shade indicating a deficiency of nitrogenous plant food. The response of the lettuce plants to oxamide was not evident until 14 days after treatment, but at harvest time the heads of lettuce were a lush dark green and were two-thirds larger than the control heads.

EXAMPLE II

A 10 ft. row of pea vines was sprayed with an aqueous dispersion containing 0.25% by weight oxamide and 0.1–1.0% by weight of sodium lignin sulfonate as dispersing agent until the plants were completely wetted and were even dripping. An adjacent 10 ft. row of vines was sprayed with an aqueous solution containing 0.25% by weight of urea in a like manner. A third 10 ft. row of pea vines was left untreated as a control. At harvest the average weight of peas per plant was determined as a means for a quantitative comparison of the effects of the two different leaf fertilizing tests. The following tables show the results of this test. This test was also carried out during a period of drought which affected the yield but the differences in yield are nonetheless valid.

*Table III.—Supplemental feeding of pea vines*

| Active ingredient | Concentration | Average wt. of peas per plant (grams) | Percent increase over control |
|---|---|---|---|
| Oxamide | 0.25 | 11.1 | 253 |
| Urea | 0.25 | 8.1 | 184 |
| None (control) | | 4.4 | |

Here too the effect of urea was noticeable 6 days after treatment while the effect of oxamide was noticeable 14 days after treatment, but the response to oxamide was continuous throughout the growing season to harvest while that of urea was only for about one-half the time from treatment to harvest.

EXAMPLE III

The leaves of beet plants in a 10 ft. row were sprayed until the aqueous spray composition completely wetted and ran off the leaves. This spray was an aqueous dispersion containing 0.25% by weight of oxamide and 0.1–1.0% by weight of sodium lignin sulfonate as a dispersing agent. The leaves of another 10 ft. row of beet plants were sprayed in a similar manner with a 0.25% by weight aqueous solution of urea. A third 10 ft. row of beet plants was left untreated as a control. The results of this supplemental feeding of beet plants is tabulated below:

*Table IV.—Supplemental feeding of beet plants*

| Active ingredient | Concentration by weight, percent | Plants | Average weight (grams) | |
|---|---|---|---|---|
| | | | Leaves | Roots |
| Oxamide | 0.25 | 55.9 | 22.9 | 33.0 |
| Urea | 0.25 | 54.7 | 24.8 | 29.9 |
| None (control) | | 54.6 | 24.6 | 30.0 |

Urea in this test had little effect on the beet plants but oxamide brought about a 10% increase in the beet root growth rather than increasing the leaf growth as might be expected.

It is of interest to note that although oxamide contains 31.8% nitrogen and urea contains 46.7% nitrogen that the response of the plants to oxamide was superior to the response of the same plants to urea.

The response to the supplemental feeding of diamide by plants is not limited to the succulent annual plants. Biannuals and perennials even woody tissue perennials such as trees respond equally as well to supplemental feeding with diamides of dibasic acids. The following example will illustrate the response of a perennial woody tissue plant to leaf fertilization according to this invention.

EXAMPLE IV

A group of twelve 10 ft. hemlock trees growing in a water-logged soil which had a sufficient quantity of all plant nutrients other than nitrogen (nitrogen fixing bacteria do not thrive in poorly aerated soil or water-logged soil) was employed in a supplemental feeding test. All 12 of these trees were sprayed with an aqueous dispersion containing 0.25% by weight of oxamide and 0.1–1.0% by weight of sodium lignin sulfonate as a dispersing agent. This supplemental feeding of nitrogen was begun the 3rd day of September. On the 12th of September many buds on these hemlock trees had broken out and were beginning to develop. On the 10th of October new growth was evident on all the branches of the treated trees. The new growth on 20 twigs selected at random was measured. This new growth averaged 4.75 inches and the needles on this new growth were nearly twice as long as the old needles. By an examination of the root system of the treated trees and untreated trees growing under the same natural conditions, it was found that the root systems of the trees which had received the supplemental feeding were 50% larger than the root system of the trees which had received no supplemental feeding.

Separate plots of blue grass lawn in northern Ohio were sprayed December 6 with aqueous compositions containing 20% by weight of various nitrogenous materials. One plot was treated with a dispersion of oxamide at the rate of 500 pounds of oxamide per acre, a second plot was treated with a solution of ammonium nitrate at the rate of 500 pounds of ammonium nitrate per acre, a third plot was treated with a 20% dispersion of urea nitrate at the rate of 470 pounds of urea nitrate per acre, a fourth plot was treated with a 20% dispersion of urea oxalate at 600 pounds of urea oxalate per acre, and a fifth plot was left untreated as a control. The grass treated with ammonium nitrate had considerable leaf burn. In May of the following year it was observed that the plot treated with urea nitrate showed little improvement over the control and the plots treated with ammonium nitrate and urea oxalate appeared to be slightly improved over the control. But the plot treated with oxamide not only had lush fast-growing grass which was a much darker green than any of the other plots but this plot maintained a higher rate of growth of darker green grass throughout the entire growing season.

Results substantially equivalent to those shown in the above examples can be obtained by the use of such other diamides as malonamide, succinamide, glutaramide, adipamide and pimelamide, when the quantity of such diamide deposited has been increased with due regard to the nitrogen content of each specific compound.

The aqueous spray compositions employed in the above examples were applied with a pressurized sprayer having an ordinary spray nozzle. Such sprayers require the use of relatively large volumes of spray compositions, 50 gallons to 200 gallons of spray covering about 1 acre. When sprayers of this type are employed it will be found desirable to use aqueous spray compositions containing from 0.1% to about 20% by weight of the diamide of the dibasic acid. The precise amount of any one of the specific diamides herein disclosed which should be used in preparing such aqueous spray compositions will, of course, vary with the nitrogen content of the diamide selected.

Another factor which will influence the selection of the concentration of the diamide especially when applied to annual crop plants is the length of time the plants to be treated will require supplemental feeding of nitrogen containing nutrient. For example such rapidly maturing leafy plants as leaf lettuce require only a relatively small deposit of the diamide in a low concentration spray such as one containing 0.1% to 1.0% of the diamide applied at the rate of about 50 to 100 gallons per acre. On the other hand such long growing high nitrogen consuming plants as corn require a large deposit of the diamide and hence higher concentration sprays such as those containing from 0.5% to 15% by weight of the diamide applied at the rate of 100 gallons to 300 gallons per acre.

Spray equipment such as the mist sprayers employ pressurized air to atomize low volumes of spray compositions. By the use of such equipment only 10 to 100 gallons of spray compositions are required to adequately cover an acre. When such equipment is employed, the fact that a given volume of spray will cover a much greater area permits the use of spray compositions containing the diamide in a concentration of 10% by weight or even as high as 25%. Regardless of the spraying equipment it is ordinarily desired to apply the amide at the rate of about 1 to 500 pounds per acre.

Leaf feeding compositions herein disclosed may be modified by the addition of insecticidal and fungicidal materials as well as plant growth regulants to provide a multi-purpose spray. The following are suitable spray formulations for the purposes indicated:

A. Control of apple scab and coddling moth and leaf feeding of nitrogen nutrients for apple trees:

4 lbs. "Goodrite p. e. p. s."
0.5 to 2 lbs. sulfur (micronized)
0.5 to 1 lb. D. D. T. (wettable)
2.0 to 4.0 lbs. oxamide
Water to make 100 gal. of spray or 4 lbs. "Goodrite p. e. p. s."
3 lbs. lead arsenate
3 lbs. hydrated lime
¾ pt. "Black Leaf 40" (40% nicotine sulfate)
0.5 to 1.0 lbs. sulfur
2.0 to 4.0 lbs. oxamide
Water to make 100 gal. of spray B. Control of bean rust, Mexican bean beetle and Japanese beetle and leaf feeding of beans:

4 lbs. "Goodrite p. e. p. s."
0.5 lb. sulfur or thiuram disulfide
0.5 to 1 lb. D. D. T. or benzene hexachloride
2.0 to 40 lbs. oxamide
Water to make 100 gal. of spray or 4 lbs. "Goodrite p. e. p. s."
10 lbs. rotenone powder (2%)
20 lbs. oxamide
Water to make 100 gal. of spray or 4 lbs. "Goodrite p. e. p. s."
2 lbs. "Parathion" [1]
20 lbs. oxamide
Water to make 100 gal. spray

[1] 15% para-nitrophenyl diethyl thiophosphate.

C. Control of pottery mildew and aphids and leaf feeding of rose plants:

2 lbs. "Goodrite p. e. p. s."
0.5 lb. sulfur or 2 qts. lime sulfur
¾ pt. "Black Leaf 40"
1 to 20 lbs. oxamide
Water to make 100 gal. of spray Other modifications of the leaf feeding compositions of this invention including adding plant growth regulants such as naphthalene acetic acid, phenoxy acetic acid and the like may also be employed. By the use of such compositions the plants would receive supplemental nitrogen nutrient and at the same time parthogenesis could be induced.

While I have disclosed specific examples of this invention I do not desire or intend to limit myself thereto for as hitherto stated the precise proportions of the active ingredients can be varied and the equivalent chemical compositions can be substituted if desired without departing from the spirit and scope of this invention as defined in the appended claims.

I claim:

1. The method of feeding nitrogenous plant nutrient to growing plants which comprises applying to the vegetative growth thereof a diamide of an organic dicarboxylic acid having 2 to 7 carbon atoms.

2. The method of feeding nitrogenous plant nutrient to growing plants which comprises applying to the vegetative growth thereof a composition containing from 0.1% to 10% by weight of oxamide uniformly dispersed in a carrier.

3. The method of feeding nitrogenous plant nutrient to plants which comprises applying a sufficient amount of oxamide to the plant foliage.

4. A non-phytotoxic composition for application to the vegetative growth of plant life to provide nitrogenous plant nutrient at a controlled rate, said composition comprising a diamide of an aliphatic organic dicarboxylic acid having 2 to 7 carbon atoms, as essential nitrogen-supplying agent, together with a sticking agent consisting of natural semi-drying oils and water-insoluble, synthetic polymeric materials to promote effective contact of said nitrogen-supplying agent with said vegetative growth and retard removal of said nitrogen-supplying agent by dew and rainfall.

5. A non-phytotoxic aqueous spray composition for application to the vegetative growth of plant life to provide nitrogenous plant nutrient at a controlled rate, said spray composition comprising oxamide, as essential nitrogen-supplying agent, dispersed in an aqueous dispersion of a water-insoluble, synthetic polymeric material which promotes effective contact of the oxamide with the vegetative growth and retards removal of the oxamide by dew and rainfall, said spray composition containing oxamide in an amount of from 1 to 40 pounds per 100 gallons of spray.

6. A non-phytotoxic aqueous spray composition for application to the vegetative growth of plant life to provide nitrogenous plant nutrient at a controlled rate, said spray composition comprising oxamide, as essential nitrogen-supplying agent, incorporated in an aqueous dispersion of polyethylene polysulfide containing a lignin sulfonate dispersing agent, said composition containing oxamide in an amount of 1 to 40 pounds oxamide per 100 gallons of spray.

WALDO L. SEMON.

References Cited in the file of this patent

UNITED STATES PATENTS

| Number | Name | Date |
|---|---|---|
| 2,109,941 | D'Alelio et al. | Mar. 1, 1938 |
| 2,568,034 | Stewart | Sept. 18, 1951 |

OTHER REFERENCES

Technical Papers—New Group of Plant Growth Regulators, Hoffman and Smith, Science—vol. 109, June 10, 1949, pgs. 588–590.

Hackh's Chemical Dictionary—Grant—3d Ed., The Blakiston Company, Philadelphia, Pa., (1944) page 604.